Feb. 9, 1937.  M. A. McMICHEN  2,070,489
RETARDED ACTION HYDRAULIC ACCELERATOR
Filed July 8, 1935
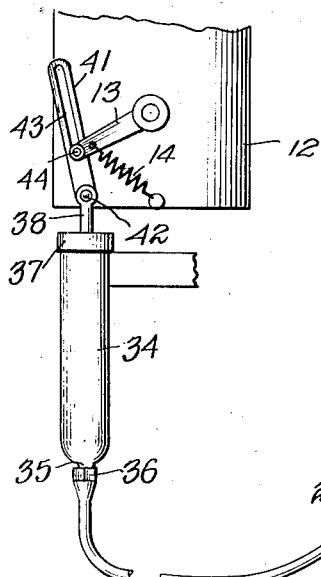
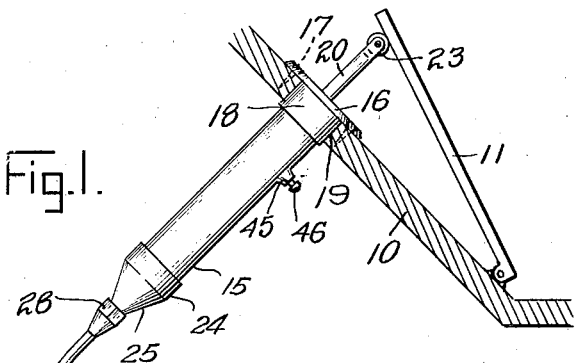
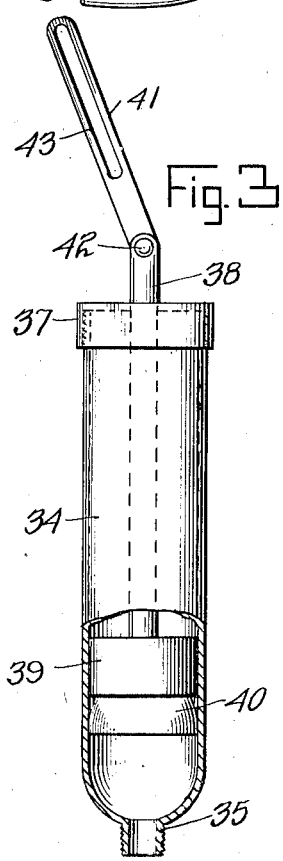
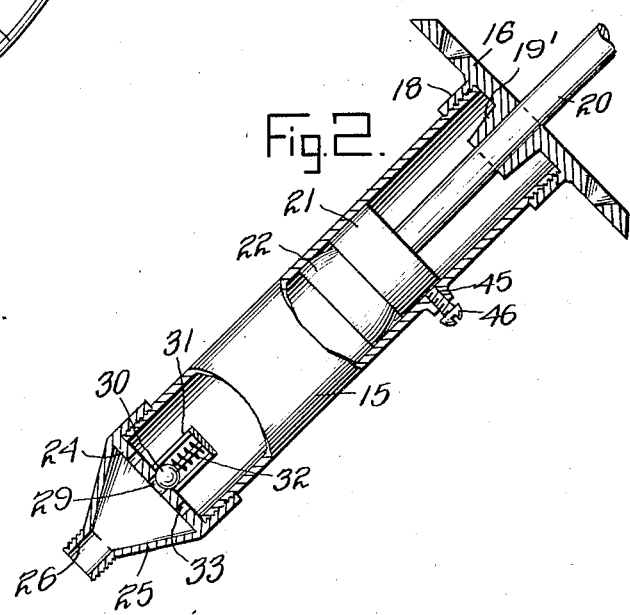
Marcus A. McMichen
INVENTOR
BY Victor J. Evans & Co.
ATTORNEYS Patented Feb. 9, 1937

2,070,489

UNITED STATES PATENT OFFICE 2,070,489

RETARDED ACTION HYDRAULIC ACCELERATOR

Marcus Ancle McMichen, Atlanta, Ga.

Application July 8, 1935, Serial No. 30,418

2 Claims. (Cl. 137—139)

This invention relates to retarded action hydraulic accelerators and has for an object to provide a device of this character which may be readily installed on motor vehicles and in use will permit a retarded action of the accelerator with quick release after each actuation so that the motor will deliver greater power, accelerate faster, etc., than ordinarily where the throttle movement is unrestrained.

A further object is to provide a device of this character which will not interfere with the motor being raced in making repairs, adjustments, checking knocks, etc.

A still further object is to provide a device of this character which will be formed of a few, strong, simple and durable parts, which may be easily manufactured, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1 is a side elevation of a retarded action hydraulic accelerator constructed in accordance with the invention.

Figure 2 is a longitudinal sectional view through one of the hydraulic cylinders showing the check valve and by-pass ports for the fluid.

Figure 3 is a side elevation of the companion hydraulic cylinder with parts broken away.

Referring now to the drawing in which like characters of reference designate similar parts in the various views, 10 designates the floor board, 11 the accelerator pedal, 12 the carburetor, 13 the throttle valve control lever and 14 the spring which tends to hold the throttle valve closed, these parts all being conventional.

In carrying out the invention a hydraulic cylinder 15 is provided and in the present embodiment the cylinder is shown as attached to the floor board 10 by means of a cap nut 16 which is mounted on the floor board underneath the accelerator pedal by means of screws 17 and is provided with an internally threaded flange 18 which extends through an opening 19 in the floor board and into which the upper end of the cylinder 15 is screwed. The cap is provided axially with a smooth bore bearing 19' to receive the stem 20 of a piston 21 which is slidably mounted in the cylinder and is provided with a tapered washer 22 to seal the piston fluid-tight in the cylinder. The upper end of the piston rod is provided with a roller bearing 23 which engages the underneath face of the accelerator pedal.

The lower open end of the cylinder 15 is closed by a cap nut 24 having a funnel shaped extension 25 the small end of which terminates in a threaded nipple 26 to which is attached a pipe 27, the pipe having a fluid-tight coupling member 28 of conventional type threaded on to the nipple 26. The cap nut 24 is provided with an axial opening 29 in which is seated a ball check valve 30, the cage 31 of the valve being disposed axially within the cylinder and housing a helical spring 32 which tends to constantly hold the ball check valve closed to seal the outlet opening 29.

A plurality of by-pass openings 33 are arranged in the end of the cap nut contiguous to the outlet opening 29, and when the piston 21 is depressed the fluid medium is pressed out of the cylinder through the by-pass openings 33 and into the pipe 27. Upon the piston being released the fluid is forced back into the cylinder, dislodging the ball check 30 and permitting a quick return of the piston to initial position.

The companion cylinder 34 is provided in the bottom with a threaded nipple 35 which receives a fluid-tight coupling 36 on the pipe 27. The top of the cylinder is closed by a flanged cap 37 which is provided with an axial opening to receive the piston rod 38 of a piston 39 which is provided with a tapered washer 40 to seal the piston fluid-tight in the cylinder. The cylinder may be secured to the motor or other stationary part of the vehicle contiguous to the carburetor 12, in any preferred manner. A connecting link 41 is pivotally connected to the upper end of the piston rod 38 by means of a pivot pin 42 and is provided with a longitudinal slot 43 which receives a pivot pin 44 carried by the throttle valve lever 13.

A bleeder opening 45 is formed in the side of the cylinder 15 and is closed by a threaded plug 46. Through the bleeder opening, the cylinder 15, the pipe 27, and the cylinder 39 are filled with hydraulic brake fluid as will be understood. Pressure on the fluid exerted by the piston 21 will be transmitted to the piston 39 to open the throttle valve, return of the parts to initial position being effected by the contraction of the spring 14. A too rapid flow of the fluid medium is retarded in one direction by the by-pass openings 33 and is accelerated in the opposite direction by opening of the check valve 30. Consequently if the throttle is calibrated to take about four seconds for the maximum stroke in opening the throttle to wide open position, it will be apparent that many advantages such as increased gas mileage, reduced piston and cylinder wear, as well as decreased crank case dilution will be promoted.

By virtue of the pivotal connection 42 of the piston rod 38, and the slot 43 in the link 41, the motor may be raced by manual manipulation of the throttle lever 13 without disturbing the adjustments of the hydraulic accelerator device, when it is necessary to make repairs, adjustments, check knocks, or other work on the motor.

From the above description it is thought that the construction and operation of the invention will be fully understood without further explanation.

What is claimed is:

1. A hydraulic accelerator for internal combustion engines including a carbureter throttle valve having a control lever, an accelerator pedal, a pair of fluid pressure cylinders, pistons in the cylinders, rods for the pistons, a tube connecting the cylinders together in advance of their pistons, a link pivotally connected to the piston rod of one of the cylinders and having a longitudinal slot, a pivot pin on the throttle valve control lever slidably received in said slot and permitting the engine to be raced by manipulation of the link without disturbing the position of the piston rod to which the link is attached, a roller carried by the piston rod of the other cylinder and engaging the underneath face of the accelerator pedal, a spring for returning the throttle valve control lever to initial position after each actuation, and a check valve in the cylinder having the accelerator pedal operated piston permitting quick passage of the fluid in a direction to close the throttle valve, there being bypass openings in the last named piston permitting a retarded passage of the fluid in a direction to open the carbureter throttle valve.

2. A hydraulic accelerator for internal combustion engines including a carbureter throttle valve having a control lever, an accelerator pedal, a pair of fluid pressure cylinders, pistons in the cylinders, rods for the pistons, a tube connecting the cylinders together in advance of their pistons, a link pivotally connected to the throttle valve and to the piston rod of one of the cylinders, means connected to the link permitting the engine to be raced by manipulation of the link without disturbing the operative position of the piston to which the link is attached, a roller carried by the piston rod of the other cylinder and engaging the underneath face of the accelerator pedal, a spring for returning the throttle valve control lever to initial position after each actuation, and a check valve in the cylinder having the accelerator pedal operated piston permitting quick passage of the fluid in a direction to close the throttle valve, there being by-pass openings in the last named piston permitting a retarded passage of the fluid in a direction to open the carbureter valve.

MARCUS ANCLE McMICHEN.